(12) United States Patent
Hoover

(10) Patent No.: US 6,909,516 B1
(45) Date of Patent: Jun. 21, 2005

(54) TWO DIMENSIONAL SURFACE MOTION SENSING SYSTEM USING REGISTRATION MARKS AND LINEAR ARRAY SENSOR

(75) Inventor: Martin E. Hoover, Rochester, NY (US)

(73) Assignee: Xerox Corporation, Stamford, CT (US)

(*) Notice: Subject to any disclaimer, the term of this patent is extended or adjusted under 35 U.S.C. 154(b) by 1051 days.

(21) Appl. No.: 09/692,336

(22) Filed: Oct. 20, 2000

(51) Int. Cl.$^7$ .............................................. G01B 11/04
(52) U.S. Cl. ....................... 356/615; 347/116; 347/250; 399/301
(58) Field of Search ................................ 356/614–615; 437/115–116, 118, 250, 248; 399/301, 162; 250/559.01, 559.1, 559.44; 347/115–116, 118, 250, 248

(56) References Cited

U.S. PATENT DOCUMENTS

| | | | |
|---|---|---|---|
| 4,912,491 A | | 3/1990 | Hoshino et al. ............ 346/160 |
| 5,208,796 A | * | 5/1993 | Wong et al. ................. 369/97 |
| 5,278,625 A | | 1/1994 | Charnitski et al. ...... 355/326 R |
| 5,300,961 A | | 4/1994 | Corona et al. ............. 346/160 |
| 5,302,973 A | | 4/1994 | Costanza et al. .......... 346/108 |
| 5,381,165 A | * | 1/1995 | Lofthus et al. ............ 347/232 |
| 5,383,014 A | | 1/1995 | Nowak et al. ................ 356/28 |
| 5,654,951 A | * | 8/1997 | Hoover et al. ............... 369/97 |
| 5,808,658 A | * | 9/1998 | Hoover ...................... 347/250 |
| 5,815,481 A | | 9/1998 | Hou et al. .................... 369/97 |
| 5,889,545 A | | 3/1999 | Rauch et al. ............... 347/134 |
| 6,128,459 A | | 10/2000 | Iwata et al. ................. 399/301 |
| 6,275,244 B1 | * | 8/2001 | Omelchenko et al. ...... 346/116 |
| 6,369,842 B1 | * | 4/2002 | Abramsohn ................ 347/116 |

* cited by examiner

*Primary Examiner*—Gregory J. Toatley, Jr.
*Assistant Examiner*—Sang H. Nguyen (57) ABSTRACT

A simplified system for sensing the movement and/or position on both axes of a moving surface, such as a photoreceptor belt of a xerographic printer, or a sheet transport of an ink jet printer, utilizing a linear track of small and closely spaced "Z" shaped marks on or in a moving belt or roller surface. These marks are used to accurately incrementally directly detect surface motions in both orthogonal axes with a co-linear optical sensor linear array of a multiplicity of individual pixel optical detectors which respectively detect and compare the changes in positions relative thereto of the transverse and angled lines of those Z marks during frequent short measurement intervals. This exemplary system provides direct, and thus more accurate, surface movement measurement information, with much less critical and less costly marking requirements, and greater tolerance for variations in the subject surface, as compared to indirect or conventional encoder type positional sensors.

11 Claims, 4 Drawing Sheets

TWO DIMENSIONAL SURFACE MOTION SENSING SYSTEM USING REGISTRATION MARKS AND LINEAR ARRAY SENSOR

Cross-reference is made to a commonly assigned U.S. application Ser. No. 09/687,108 filed Oct. 16, 2000, now U.S. Pat. No. 6,369,842 issued Apr. 9, 2002 by Dennis A. Abramsohn, entitled "Permanent Photoreceptor Registration Marking And Method".

Disclosed herein is a simplified system for sensing the position and/or movement on both axes of a moving surface, utilizing "Z" shaped or other suitable such registration marks on or in the moving surface to be measured, and a detector for optically detecting the position of that registration mark on two axes relative to that detector, to provide signals indicative of the surface position and/or movement in both dimensions (both orthogonal axes).

As will be described, the detector of the disclosed embodiment for providing positional information as to surface movement on both axes is desirably a single low cost linear multi-element optical sensors array. The disclosed embodiment provides direct, and thus more accurate, surface position and/or movement measurement information, as compared to indirect sensors such as rotary encoders or belt edge sensors.

By way of background, one example of a low cost commercially available linear multi-sensor imaging bar is the Sony Model ILX511 2048 pixel CCD linear image sensor. That is a black and white image sensor, usable for optical measuring and bar code scanning. Various low cost color imager bars are also commercially available.

By way of background there is particularly noted Xerox Corp. U.S. Pat. No. 4,837,636 issued Jun. 6, 1989 to J. Daniele and R. Lofthus entitled "Motion Sensor for Sensing the Relative Position and velocity of a recording Member." It discloses, inter alia, a xerographic copying or printing machine with a row of fiducial image marks (belt holes) along one side of the photoreceptor (PR), and a CCD linear array type photodetector aligned therewith to provide successive blocks of timing signals to provide signals representative of the photoreceptor speed and motion. Another Xerox Corp. U.S. patent citing that patent and involving similar technology is U.S. Pat. No. 5,204,620 issued Apr. 20, 1993 to D. Constanza et al entitled "Photoreceptor Motion Sensor Using A Segmented Photosensor Array."

The embodiment herein discloses a system for eliminating the requirement of different or specialized registration marks and different or specialized sensors for dual axis information and/or controls, by use of a single type of mark and a single sensor for dual axis positional sensing. The system of the disclosed embodiment does not require more, and more specialized, or more expensive, marks sensors or belt edge sensors. It can utilize an existing low cost sensor, which is normally used for scanning document images, used here instead as a timing and/or positional sensor for such registration marks.

This system is useful for, but is not limited to, the accurate registration of an image bearing member of a reproduction system. In particular, the photoreceptor, or an image transfer belt, or a paper transport belt, of a xerographic reproduction apparatus, such as a plural color printer. It can even be used as a test or calibration system for checking the position on both (orthogonal) axes of such "Z" marked test sheets of paper moving through various portions of the paper path of a printer in which the subject sensor may be located temporarily or permanently.

Another application or utility of the disclosed embodiments is to provide multiple Z marks, with a suitable sensor, especially, of the linear array type disclosed herein, to replace the timing or control marks along the process movement direction of the sheet transport belt (or platen roller) of an ink jet printer, as in the allowed application cited below, so that the existing, or this, or other, marks movement sensor can additionally provide lateral registration information signals. That is, for example, replacing a linear array of fairly closely spaced transverse timing marks extending along the transport belt of an ink jet printer (as in the below-cited application) such as:

-
-
-
-
- by (for example) replacing those single transverse (or somewhat angled) line belt marks with a similarly linear and fairly closely spaced array of Z marks extending along the same edge of the same belt, or around a platen roller, such as:

Z
Z
Z
Z
Z

It may be seen that the former (known) motion sensing mark track, which can be called a "ladder chart", is simply a series of straight lines perpendicular to (transverse) the process direction of motion of the belt. The latter, in contrast, is a motion sensing mark track made of "Z" marks. The top and bottom lines of the "Z" marks can effectively provide the same such set of perpendicular lines but adds diagonal line portions (hence the Z shape) used to sense lateral position of belt as further described herein.

An example of the former "ladder chart" marks sensing system is disclosed Allowed Xerox Corp. U.S. patent application No. 09/004,763 filed Jan. 8, 1998 by Frederick A. Donahue and David G. Anderson, entitled "Pagewidth Ink Jet Printer Including a Printbar Mounted Encoding Systems". It discloses, inter alia, an optical sensor in an ink jet printer sequentially detecting a linear array of transverse belt timing marks, which marks are closely and evenly spaced along one edge of the sheet transport belt of the ink jet printer. The sensor in this case is on the printbar itself.

Accurate positional sensing for the sheet being printed by an inkjet printer can provide improved quality printing. Especially, with direct belt surface motion transduction, as further described herein, providing immunity from belt thickness variations, belt stretching variations, belt mark positions variations. For example, for implementing a servo motion control system to control sheet advance incrementing of the sheet transport belt. Additionally or alternatively, using the more accurate positional sensing for better registration information for stitching together swaths of image sections, such as by pixel switching of extra ink jets and/or increased drop size or drop numbers, such that the resulting total image does not contain observable image quality defects at stitch locations.

It will be appreciated from the above and other knowledge in the art that the individual detected lines of a mark may be much thicker than the pixel spacing of the linear array detector marks sensor. For example, a typical detectable mark line could be 200 or more pixels wide and the pixel spacing of a 2000 pixel array could be only 10 microns or less. This may be used for various signal processing techniques in a known manner to determine the centroid of the mark line. While the mark thickness is not critical with that type of sensor, a sharp (unblurred) edge detection quality of the marks is desirable.

The sensing system disclosed herein may desirably utilize so-called "BLIP Sensor" (Bi-directional Linear Incremental Position) sensor technology, using such image sensor arrays. In essence, by way of background, that technique is to provide marks spaced closely enough together relative to the length of the imaging bar array so that at least one mark is always moving under the array to be sensed, and rapidly snapping fast linear images of those moving marks, and then determining where each individual mark is positioned on the image sensor, from the signals from which ones of the accurately spaced pixels of the array detect the mark at that imaging time. Then signal processing to determine the centroid of the mark locations along the array can determine the sub-pixel (micron level) location of each mark. By snapping the linear image at a periodic fixed time interval one then determine where each mark is at each imaging interval and can therefore easily calculate the incremental positional movement of each individual mark relative to where is was last time it was imaged. The marks are desirably sufficiently closely spaced so that additional belt marks are always entering the view of the sensor as the previous marks leave the view of the sensor, as the belt or platen roller moves in its process direction. Thus, it is desirable, to insure continuously monitoring the mark track or ladder, that at least 2 marks are always in the sensor view. Even more preferable is to use as many closely spaced marks as possible, so as to apply averaging to the signals from multiple marks moving past the sensor array. A key advantage of such "BLIP Sensor" technology is that the spacing between the marks on the belt need not be accurately printed, formed, or otherwise positioned along the belt, because that system utilizing the accurate spacing of the image sensor pixels and is measuring each marks motion relative thereto. That is, the spacing between the belt marks is not critical, because in this system the marks are not being used as timing marks, merely marks providing belt movement information to the sensor. That enables less critical and lower cost manufacturing of marked belts, yet highly accurate belt motion and/or positional information which may be used to control belt drive and/or image forming system motion velocity or position.

Another background reference in relation to motion control technology, using a linear array CCD image sensor for single axis linear position sensing, is an article published in the March 1990 "Motion Control" magazine entitled "Linear Encoder Uses CCD Image Sensor" by Joseph Pavlat and William Hasler of Parker Hannifin Corporation.

As disclosed herein, it has been found that the above-described BLIP sensor or other such motion sensing technology may be effectively used with the top and bottom lines of Z marks where the Z marks are smaller in the process direction than the length of the linear detector array. Preferably, the Z marks are sufficiently small and sufficiently closely spaced along the moving surface such that at least two or three such Z marks will be within the view of (within the length of) the sensor array of multiple pixels during the marks detection, so that the sensor array can take sensing signal "snapshots" of its respective pixels every millisecond or so. As disclosed herein, this can provide an averaged micron accuracy level signal "ruler" of both the transverse and diagonal lines of more than one moving Z mark, so as to more accurately measure both process direction and transverse direction surface motion. With such BLIP sensor or other such mark motion sensing systems, the spacing between the bottom line of one Z mark and the top line of the next Z mark, and the top line to bottom line height or symmetry of each Z mark, need not be identical.

Further in that regard, the interpolation to sub-pixel resolution may done using either or two methods: multiple mark movements averaging, as noted, and/or gray level centroidal processing. In the embodiment herein, this gray level centroidal processing technique may desirably be used to enable the lateral sensing extension to linear bi-directional sensing by using Z marks. As disclosed herein, the position or distance between the two transverse lines formed by the top and bottom of a Z mark and the crossing of the diagonal line of the Z mark may be measured by the sensor array to micron level resolution by calculating the centroid of these 3 crossing locations on the linear image sensor array. If a Z mark is laterally centered on (relative to) the array line of the linear image sensor array, the detected distance (pixel count) between the top line of the Z mark and the to diagonal line of that Z mark will be the same as the distance to the bottom line of that Z mark. If the Z mark has moved laterally in a subsequent sensor imaging cycle, it will not be.

To express this in other words, an important advantage of using a linear image sensor array motion detection approach is to enable relaxation of the marks spacing or scale. This is particularly desirable for a photoreceptor belt of a xerographic printer, because of the difficulty in permanently marking the PR belt with an accurate scale. With this sensing approach the signals are sampled data of incremental position numbers which may be taken in fixed times to measure variable positions. In other words, at every millisecond or so the sensing system can measure and report how many microns a mark, and thus the marked object, has moved since the previous millisecond.

This is significantly different than the more conventional technique of a linear optical encoder with a more accurate, and hence more expensive, scale, using detectors that trigger timing edge signals from the scale marks. In other words, where every X microns of movement of the timing marks scales the sensor outputs one transition (position clock), with frequency proportional to velocity.

In the system of the disclosed embodiment, the addition of diagonal lines to the marks (by using Z marks) may have implications in some cases on mark spacing which may be counter to the relaxation of mark spacing of BLIP type systems as discussed above. For example, where accurate printing or forming of Z marks on or in the belt presents difficulties, or where the belt is elastomeric, and may stretch. However, it has been found, and disclosed herein, that this may be addressed by using differential measurement. That is, by subtracting the top line of the Z from the bottom line of the Z. Thus, even if the Z mark is stretched, the zero location for the lateral central location will still be in the center of the Z.

As will be noted, the terms Z or Z marks as used herein are not limited to the exact form of normal alphabetic Z. For example, reversed or mirror image Z's may be used, or very similarly functioning marks may be provided along the subject belt, such as an array of "chevron" marks rotated 90 degrees, interspersed or alternating with the transverse marks, providing, in combination, an effective Z mark. For example:

-
-
>

By way of further background, it is known to provide temporary or permanent "Z" shaped registration (fiducial) marks on or in desired areas of a moving photoreceptor or other image bearing belt surface, to be sensed by other, specialized, optical mark sensors. For example, the following five recent Xerox Corp. U.S. patents are noted as specifically mentioning one or more registration systems utilizing "Z" shaped marks, patterns, or targets on a photoreceptor: U.S. Pat. Nos. 5,889,545; 5,815,481; 5,302,973; 5,300,961; and 5,278,625. (Registration marks on a photoreceptor or other belt may be called "MOB", for marks-on-belt, there and herein).

While the various methods for forming permanent or temporary "Z" shaped registration (fiducial) marks on or in desired areas of a moving belt is not part of this invention, and the present invention is not limited in that respect, examples are disclosed in the above and other references cited herein. For example, the marks may be made by making the desired belt areas transparent, and thus readily optically detectable relative to other belt areas, without requiring apertures or other physical impairment of a photoreceptor belt, as described in the above cross-referenced application. Also, Canon U.S. Pat. No. 4,912,491, priority-filed May 30, 1987 and issued Mar. 27, 1990 to O. Hoshino, et al, appears to teach some form of permanent transparent areas of an intermediate image transfer belt (not a photoreceptor) for providing optically sensed registration marks, in a ROS (raster output scanner) raster imaged tandem (plural print engines) printer, for superposing plural xerographic color images with registration.

By way of further background, in various reproduction systems, including xerographic printing, the control and registration of the position of imageable surfaces such as photoreceptor belts, and/or Images being placed thereon, is critical, and a well developed art, as shown by exemplary patents cited below. It is well know to provide various single and/or dual axes control systems, for adjusting or correcting the lateral position and/or process position or timing of a photoreceptor belt or other image bearing member of a reproduction apparatus, such as by belt lateral steering systems and/or belt drive motor controls, and/or adjusting or correcting the lateral position and/or process position or timing of the placing of images on the belt with adjustable image generators such as laser beam or raster scanners.

The following exemplary U.S. patents are noted for discussions of photoreceptor or intermediate belt motion sensing with permanent belt fiducial or registration (and/or belt seam location) markings, by belt holes or other apertures, and optical sensors and/or belt steering controls: U.S. Pat. Nos. 4,837,636; 5,175,570; 5,204,620; 5,208,633; 5,248,027; 5,278,587 (on plural ROS beam sweep detections for single pass registered color printing); U.S. Pat. No. 5,383,014; and pending Xerox Corp. U.S. application Ser. No. 09/450,375, filed Nov. 29, 1999 by Castelli, et al.

Further by way of background, as noted, the direct sensing of the surface motion of image receivers, such as photoreceptor belts, intermediate transfer belts, or other substrates, such as paper, as by the system of the embodiment disclosed herein, enables more precise transport and/or image registration, for superior image quality.

In contrast, a principle method of accurately sensing photoreceptor belt motion in the process direction in present practice for xerographic printers is to use a relatively expensive precision machined encoder roll in contact with the back surface of the belt (or on the drive shaft of the belt drive). The encoder roll may be coupled to a rotary shaft encoder with an anti-rotational coupling that helps avoid errors from misalignment. Motion sensing errors that can contribute to errors in color registration systems with such belt-driven encoder sensors can come from encoder roll eccentricity, rotary encoder accuracy (once per roll revolution errors) as well as errors from belt slip, belt stretch, and belt thickness variations. The once per encoder roll revolution type errors may be addressed by employing design rules that locate marking elements spaced apart at integer numbers of encoder roll revolutions, to synchronize the errors between color separations. However, this imposes disadvantageous machine architecture and physical size constraints. Avoiding those constraints could enable smaller size/height machines, or location of multiple image stations on the same side of a photoreceptor belt module, which in turn enables avoidance of other errors that can be encountered when locating imagers on both sides of a belt module.

Low frequency process direction of movement errors, such as once per belt revolution, or other errors that accumulate in transporting the belt for multiple images, may even invisible to encoder roll registration controls. This is primarily attributed to belt thickness variations caused by the encoder roll sensing the belt from the backside with the belt flowing over this roll in a wrap condition. Advantages of the subject position measurement system include eliminating such error sources and thus improve registration. By directly measuring the belt surface position with a high degree of accuracy, those sensor signals can be inputted into an agile beam imager such as the variable imaging position ROS systems shown in FIGS. 1 and 2, to implement a printing system that can allow relaxation of motion control requirements or tolerances for the belt surface, and potentially eliminating the need for an expensive precision belt movement rotary encoder and its circuitry.

A principle method of accurately sensing photoreceptor belt position in the lateral direction in present practice for xerographic printers is to use a belt edge position sensor. Such sensors may be contact lever-arm type sensors or non-contact opto-electronic type edge sensors that have an analog output voltage proportional to edge position. However, the belt edge may have variations in position with respect to the center line of the belt due to belt width variations that may require those belt edge variations to be learned relative to the seam hole and stored in controller memory to be fed forward as a cancellation correction to the lateral position measurement. The present system can avoid that, and thus also enable simplification and reduction in cost in the belt steering control, by eliminating the non-volatile memory needed to store the learned edge variations and to execute cancellation corrections in real time as well as the cost of a separate belt edge sensor. Also, eliminating the time and other costs in measuring and storing the data on the belt edge variations.

One important application of such accurate registration systems is to accurately control the positions of different colors being printed on the same intermediate or final image substrate, to insure the positional accuracy (adjacency and/or overlapping) of the various colors being printed. That is, to improve the registration accuracy of such plural color images relative to one another and to the image bearing member, so that the different color images may be correctly precisely positioned relative to one another and/or superposed and combined for a composite or full color image, to provide for customer-acceptable color printing on a final image substrate such as a sheet of paper. The individual primary color images to be combined for a mixed or full color image are often referred to as the "color separations."

It is known that permanent belt registration marks may be combined with, as part of, known systems to adjust the registration of the images on either or both axes (the lateral axis and/or the process direction axis) relative to the image bearing surface and one another by adjusting the position or timing of the images being formed on the image bearing surface. That may be done by control of ROS (raster output scanner) laser beams or other known latent or visible image forming systems.

In particular, it is known to provide such imaging registration systems by means of marks-on-belt (MOB) systems, in which edge areas of the image bearing belt laterally outside of its normal imaging area are marked with registration positional marks, detectable by an optical sensor. As noted above, especially for belt steering and motion registration systems (previously described) such registration marks can be permanent, such as by silk screen printing or otherwise permanent marks on the belt, such as belt apertures, which may be readily optically detectable. However, for image position control relative to other images on the belt, or the belt position, especially for color printing, typically there are also image position registration marks which are not permanent marks. Typically they are marks imaged with, and adjacent to, or in between, the respective images, and developed with the same toner or other developer material as is being used to develop the associated image, in axial alignment positions corresponding to, but outside of, the image position. Such marks-on-belt image position or registration indicia are thus typically repeatedly developed and erased in each rotation of the photoreceptor belt. It is normally undesirable, of course, for such registration marks to appear on the final prints (on the final image substrate).

The above and farther background, including examples of specific MOB registration sensors and controls, is well known to those skilled in this art, and taught in numerous products and patents thereon (of which the following are some examples). Thus, it need not be repeated herein in detail. For example, the Xerox Corp. U.S. Pat. No. 5,287, 162, entitled "Method and Apparatus for Corrections of Color Registration Errors," issued Feb. 15, 1994 by DeJong, et al., describing registration with imaged and developed toner chevron MOB's and bi-cell or CCD detectors. The latter and other Xerox Corp. U.S. patents such as U.S. Pat. Nos. 5,748,221; 5,510,877; and 5,631,686, issued May 20, 1997 to Castelli, et al, are also relevant to MOB sensors and/or systems for image shifting into registration by ROS shifting and/or belt position shifting. MOB registration systems for multicolor image registration for intermediate image bearing belts (in addition to U.S. Pat. No. 5,287,162 above) are disclosed in Fuji Xerox Co. U.S. Pat. No. 6,094,551 and Xerox Corp. U.S. Pat. No. 5,384,592. Also, U.S. Pat. No. 4,963,899, issued Oct. 16, 1990 to Resch. U.S. Pat. No. 5,909,235 is of interest for noting MOB sensor registration and a background discussion of different applicable color printing systems.

Also noted is U.S. application Ser. No. 09/626,465, filed Jul. 26, 2000, entitled "Color Image Registration Based Upon Belt And Raster Output Scanner Synchronization" by Elias Panides, et al, on registering the leading edges of color images on a photoreceptor belt by ROS synchronization to belt registration holes.

As will be apparent from the above, it is generally well known in the art of reproduction systems that image registration control on an image bearing belt can be done based on MOB sensor measurements of developed marks on the belt indicative of respective image positions on that image bearing member (substrate). As also noted above, that information can be combined with additional sensor information from permanent PR belt marks or holes sensing, and belt edge sensing. As also noted, a printer image registration controller and/or electronic front end (EFE) can utilize MOB sensor inputs and permanent belt registration marks to control ROS scan lines positioning on the photoreceptor (PR) surface to correct registration of the respective image positions on both axes. That is, without necessarily requiring MOB sensor interaction with, or control over, the PR drive or PR steering controls for process direction or lateral direction registration. However, such PR registration movement, instead of, or in addition to, such imaging position registration movement, can also be done if desired.

Color registration systems for printing, as here, should not be confused with various color correction or calibration systems, involving various color space systems, conversions, or values, such as color intensity, density, hue, saturation, luminance, chrominance, or the like, as to which respective colors may be controlled or adjusted. Color registration systems, such as that disclosed herein, relate to positional information and positional correction (shifting respective color images laterally or in the process direction and/or providing image rotation and/or image magnification) so that different colors may be accurately superposed or interposed for customer-acceptable full color or intermixed color or accurately adjacent color printed images. The human eye is particularly sensitive to small printed color misregistrations of one color relative to one another in superposed or closely adjacent images, which can cause highly visible color printing defects such as color bleeds, non-trappings (white spaces between colors), halos, ghost images, etc.

Disclosed in the exemplary embodiment herein is an improved registration marks sensing system for various moving surfaces providing various advantages, including those disclosed herein.

A specific feature of the specific embodiment disclosed herein is to provide a method of accurately sensing the position of a moving surface having a primary movement direction, wherein said moving surface is marked with a plurality of optically detectable registration marks, said optically detectable registration marks having transverse lines extending transversely of said primary movement direction and angled lines extending at an angle to said primary movement direction, and wherein said optically detectable registration marks are detected by an optical registration marks sensor, wherein; said registration marks sensor comprises a linear array of a multiplicity of individual optical sensors, said registration marks sensor optically detects said optical registration marks to provide positional signals from said moving surface in said primary movement direction from said transverse lines extending transversely of said primary movement direction being moved past said registration marks sensor, and said registration marks sensor optically detects said optical registration marks to provide transverse positional signals from said moving surface orthogonal to said primary movement direction from said angled lines extending at an angle to said primary movement direction by signals from respective said individual optical sensors which are actuated by a movement of said moving surface being moved past said registration marks sensor in said primary movement direction in between a said transverse line extending transversely of said primary movement direction and a said angled line extending at an angle to said primary movement direction.

Further features disclosed in the embodiment herein, individually or in combination, include those wherein said moving surface is an imageable photoreceptor belt having said optical registration marks extending linearly along said photoreceptor belt, and/or said optical registration marks are in the general shape of a "Z," and/or said optical registration marks are in a linear array and relatively closely spaced apart, and wherein said registration marks sensor linear array of a multiplicity of individual optical sensors extends in said primary movement direction by a greater distance than said spacing between said optical registration marks, so that more than one at a time of said optical registration marks is moving past said registration marks sensor linear array of a multiplicity of individual optical sensors, and/or said optical registration marks are Z marks with top and bottom said transverse lines and a central said angled line, and said signals from said registration marks sensor linear array of a multiplicity of individual optical sensors for said central said angled line are compared to said signals from said registration marks sensor linear array of a multiplicity of individual optical sensors for both said top and bottom said transverse lines, and/or said optical registration marks are Z marks, and wherein said Z marks are smaller in said primary movement direction than the length of said registration marks sensor linear array of a multiplicity of individual optical sensors, and/or said Z marks comprise a top and bottom bar and an intermediate diagonal bar, and said registration marks sensor linear array detects an intersection location relative thereto, and wherein the differential of the diagonal bar detected intersection location relative to the top and bottom bar detected intersection location of a Z mark is used to measure lateral movement of said moving surface, and/or when said intersection location of said intermediate diagonal bar on said registration marks sensor linear array is equidistant between said top and bottom bar intersection locations, it is assumed that said moving surface is being maintained with a desired lateral registration, and/or the lateral width of said Z marks is selected to correspond to the desired maximum lateral position sensing range for said moving surface, and/or said photoreceptor belt having optical registration marks, and said photoreceptor belt having a primary movement direction, said xerographic printing apparatus also having a photoreceptor registration system for the registration of said photoreceptor belt relative to said images on said photoreceptor belt, said photoreceptor registration system including at least one registration marks sensor for optically detecting the positions of said optical registration marks of said photoreceptor belt, the improvement wherein, said optical registration marks of said photoreceptor belt have at least one edge extending transversely of said primary movement direction and at least one other edge extending at an angle to said primary movement direction, and said registration marks sensor comprises a linear array of a multiplicity of individual optical sensors which optically detect said optical registration marks to provide positional signals in said primary movement direction from said at least one edge extending transversely of said primary movement direction and also provide positional signals orthogonal to said primary movement direction from said at least one other one edge extending at an angle to said primary movement direction by a count of the number of said individual optical sensors which are actuated by the movement of said surface in said primary movement direction in between said at least one edge extending transversely of said primary movement direction and said at least one other one edge extending at an angle to said primary movement direction, and/or wherein said optical registration marks have a "Z" configuration.

The disclosed system may be operated and controlled by appropriate operation of otherwise conventional control systems in accordance with the descriptions herein. In particular is well known and preferable to program and execute control functions and logic for reproduction systems with software instructions for conventional microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, and/or prior knowledge of functions which are conventional, together with general knowledge in the software or computer arts. Alternatively, the disclosed control systems or methods may be implemented partially or fully in hardware, using standard logic circuits or single chip VLSI designs.

The term "reproduction apparatus" or "printer" as alternatively used herein broadly encompasses various printers, copiers or multifunction machines or systems, xerographic or otherwise, unless otherwise indicated or defined in the claims.

As to specific components of the subject apparatus or methods, or alternatives therefor, it will be appreciated that, as is normally the case, some such components are known per se in other apparatus or applications which may be additionally or alternatively used herein, including those from art cited herein. All references cited in this specification, and their references, are incorporated by reference herein where appropriate for teachings of additional or alternative details, features, and/or technical background. What is well known to those skilled in the art need not be described herein.

Various of the above-mentioned and further features and advantages will be apparent to those skilled in the art from the specific apparatus and its operation or methods described in the examples below, and the claims. Thus, the present invention will be better understood from this description of these specific embodiments, including the drawing figures (which are approximately to scale, unless indicated otherwise) wherein:

Figure 1:
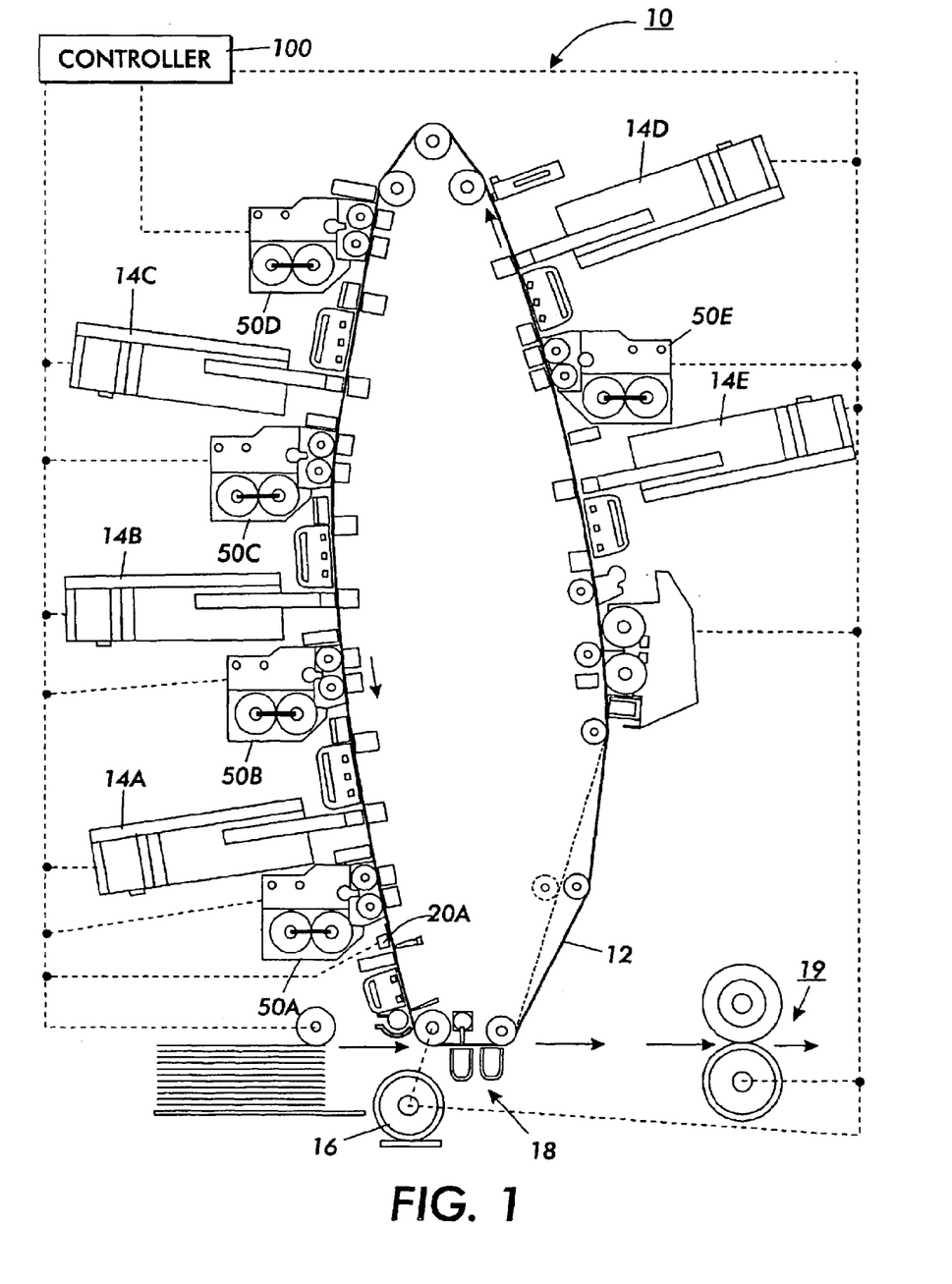
FIG. 1 is a schematic frontal view of one exemplary reproduction system incorporating one example of the subject moving surface dual axis registration system, shown here in a color-on-color xerographic printer.

Describing now in further detail the exemplary embodiment with reference to the Figures, there is schematically shown in FIG. 1 an otherwise known type of xerographic plural color "image-on-image" (IOI) type full color reproduction machine, a printer 10, merely by way of one example of the applicability of the exemplary color registration system. A partial, very simplified, schematic perspective view thereof is provided in FIG. 2. This particular type of printing is also referred as multiple exposure "single pass" color printing. It has plural sequential ROS beam sweep PR image formations and sequential superposed developments of those latent images with primary color toners, interspersed with PR re-charging. Further examples of such IOI system details are described in U.S. Pat. Nos. 4,660,059; 4,833,503; 4,611,901; etc. However, it will be appreciated that the disclosed improved registration system and method could also be employed in various other reproduction system applications. For example, "tandem" xerographic or other color printing systems, typically having plural print engines transferring respective colors sequentially to an intermediate image transfer belt and then to the final substrate. Various known types of printers are further described in the above-cited patents and need not be further discussed herein. As will also be discussed below, the present system may also be utilized in various other applications, not limited even to reproduction systems, although that is disclosed herein as particularly advantageous.

Disclosed in the embodiment herein is a registration system in which a single registration sensor provides for both lateral and process direction registration with a single linear array of multiple photodetector elements extending in the process direction of a moving surface, combined with correspondingly laterally positioned multiple "Z" shaped registration markings on the moving also extending in the process direction of that moving surface. Process direction registration may be based on the incremental movement positions of the transverse top and/or bottom (base) lines of the "Z" marks, and lateral registration may be based on which and/or how many of those multiple linear photodetector elements are triggered by the position of the inclined (angled) central line of the "Z" relative to those multiple sensors and relative to the detected base line of the "Z" by the registration sensor.

Figure 2:
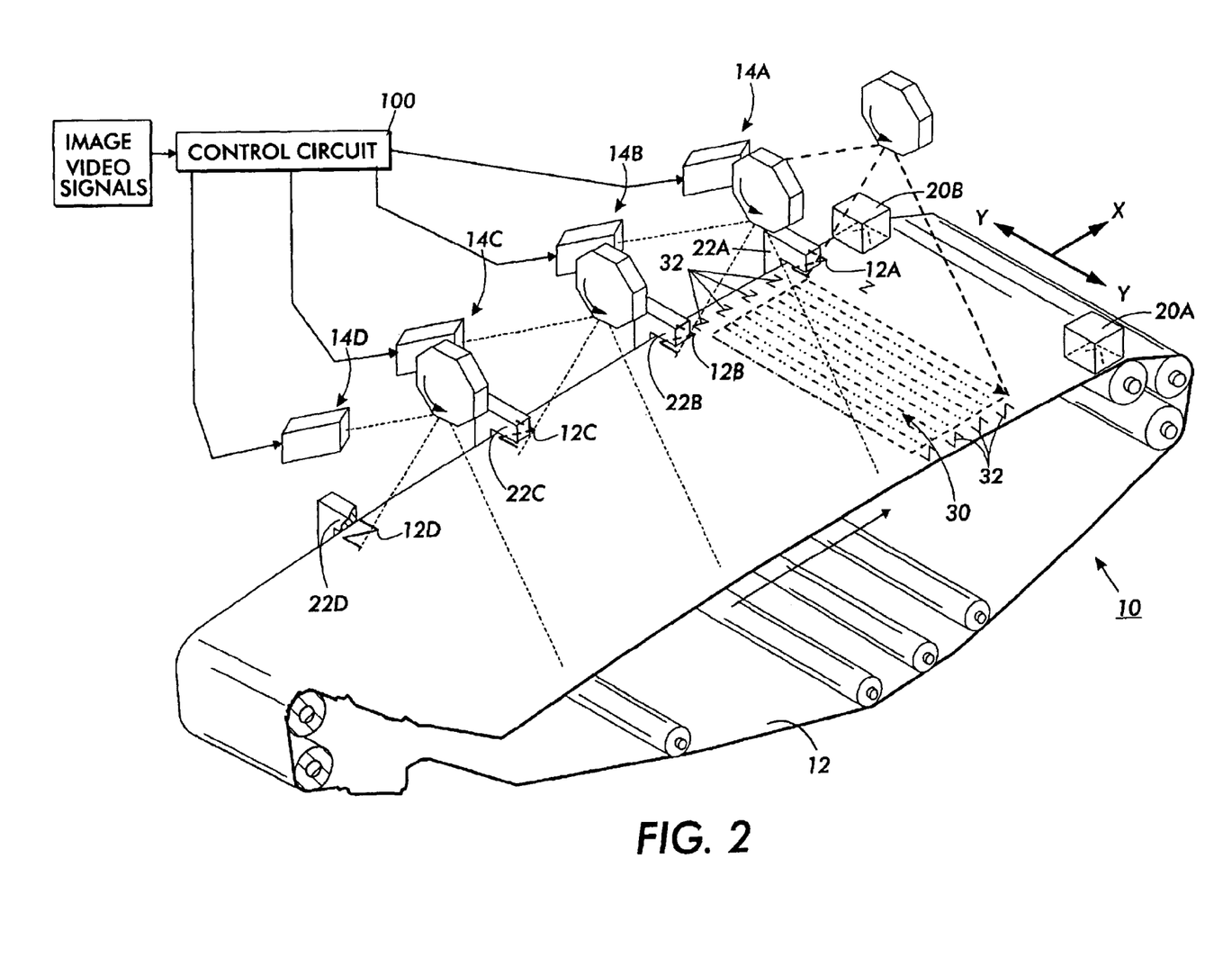
FIG. 2 is a simplified schematic perspective view of part of the embodiment of FIG. 1 illustrating an exemplary photoreceptor belt with exemplary permanent "Z" registration marks and (schematically) an exemplary optical positional sensor therefor, with other components removed for illustrative clarity.

However, first referring further to the exemplary printer 10 of FIGS. 1 and 2, all of its operations and functions may be conventionally controlled by programmed microprocessors as described above, at centralized, distributed, and/or remove system server locations, any of which schematically illustrated here by the controller 100. A single photoreceptor belt 12 may be successively charged, ROS imaged, and developed with black and/or any or all primary colors toners by a plurality of imaging stations. In this example, these imaging stations include respective ROS's 14A, 14B, 14C, 14D, and 14C; and associated developer units 50A, 50B, 50C, 50D, and 50C. Two MOB sensors 20A and 20B are schematically illustrated and will be further described herein. The belt 12 has a conventional drive system 16 for moving it in the process direction shown by its movement arrows. A conventional transfer station 18 is illustrated for the transfer of the composite color images to the final substrate, usually a paper sheet, which then is fed to a fuser 19 and outputted. The belt 12 may be an otherwise known or conventional organic photoreceptor belt, on which there is extensive patent and other literature, or other materials, and need not be described in detail herein.

Referring to FIG. 2, it may be seen that small permanent fiducial or registration "Z" marks such as 12A, 12B, 12C, 12D, etc., are shown in this example along one edge of the moving surface to be two-axis positionally measured or registered. (As used herein, the terms "positionally measured" and "registered" are used interchangeably unless indicated otherwise, although the term registration in general can also imply that the position of the surface is moved in response to the positional information from the mark position sensor). The moving surface is the photoreceptor belt 12 In this example. However, the present system could have such "Z" marks on different surfaces and in different locations, such as along both edges of the moving surface. Furthermore, the connecting ends of the three straight lines forming the "Z" mark do not necessarily have to be connected. Also, the subject "Z" marks could, in some systems, even be temporary imaged and developed marks, as also described herein.

Figure 3:
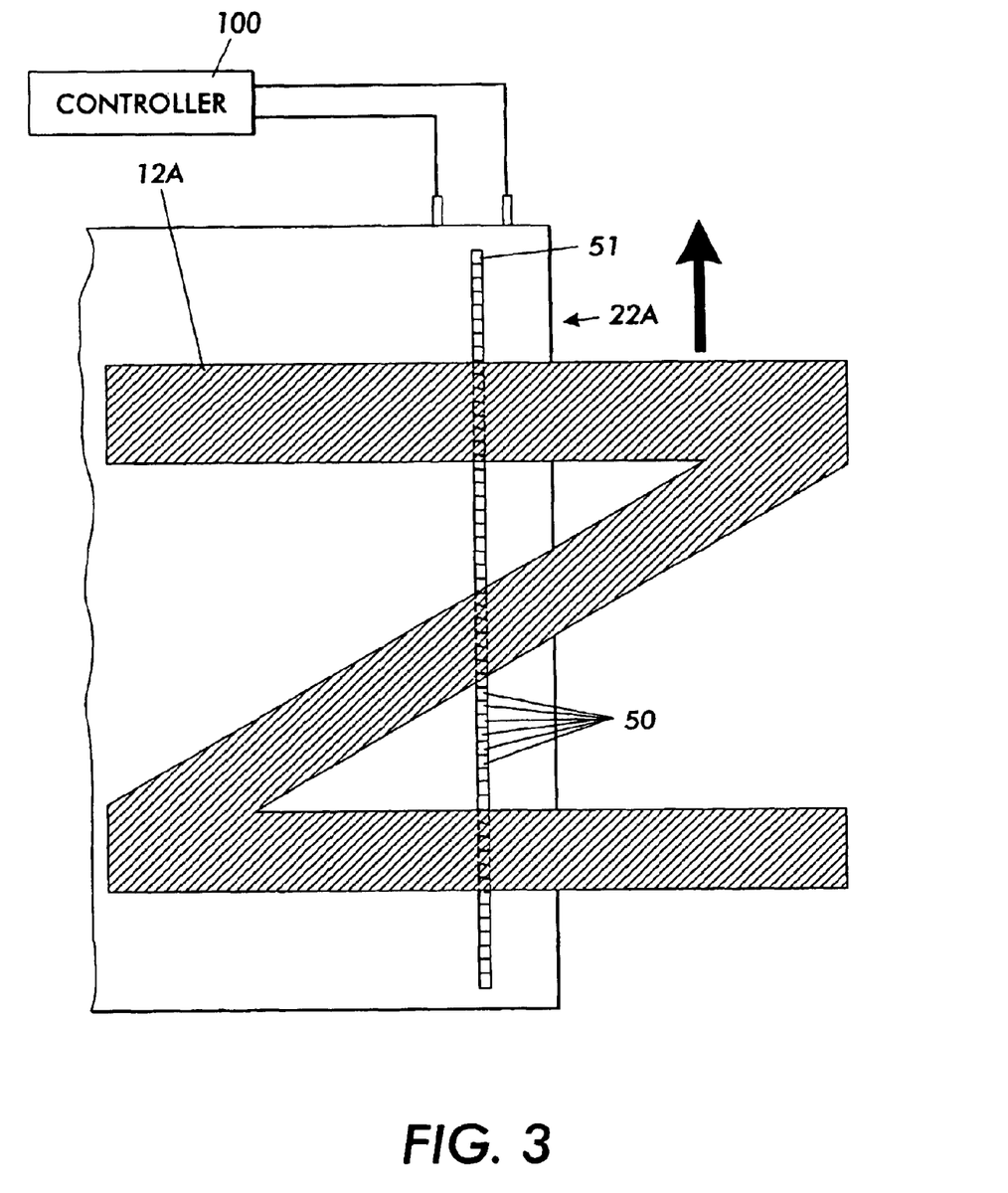
FIG. 3 is an enlarged partial plan view, viewed from underneath the photoreceptor belt (not shown, for illustrative clarity), showing the sensing of a "Z" registration mark on the photoreceptor belt of FIG. 2 by the exemplary subject single linear array imager optical positional sensor.
Figure 4:
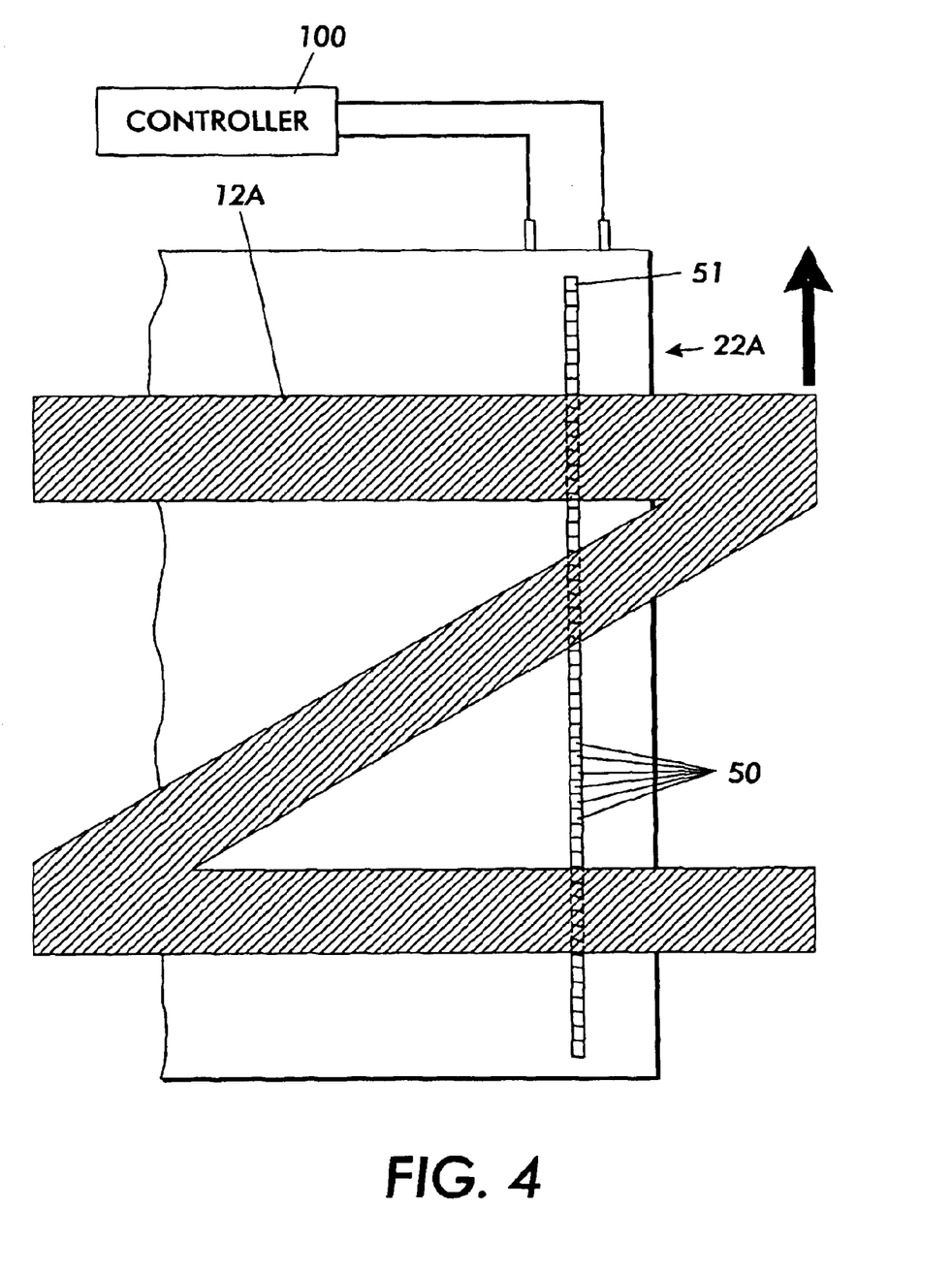
FIG. 4 is similar to FIG. 3, but illustrating a different position of the moving surface of the photoreceptor belt relative to the (stationary) optical positional sensor.

FIGS. 3 and 4 show an enlargement and two-axis positional measurement by of a single large "Z" mark 12A. Note in FIGS. 3 and 4 that the top and bottom bars of the "Z" mark are shown desirably oriented orthogonal to the process direction of motion of the surface bearing the Z mark, which direction of motion is shown by the movement arrow.

The positions of these registration marks 12A, 12B, 12C, 12D, etc., on the belt 12 are shown in FIG. 2 being optically detected by the subject two-axis optical mark sensors 22A, 22B, 22C, 22D, shown only schematically in FIG. 2. A single such sensor 22A, comprising a linear array of a large number of individual image sensors 50, is shown in FIGS. 3 and 4. As noted, this sensor 22A here is desirably an existing low cost imaging bar, rather than a normal sensor. These imaging bars are commercially available in quantities at low cost from a number of sources, and their structure and operation is well known in the art and need not be re-explained herein. These linear array imaging bars are used in many commercially available scanners or digital copiers for scanning document sheets to obtain digital images from the images on the documents. They may have a simple linear array, or a slightly staggered (offset) array, or a two or three row linear array. They may typically have thousands of closely spaced (e.g., 7 to 14 micron pixel pitch) CCD or other individual light sensors 50. It may be a so-called "full width array", or a shorter array typically used in scanners with a lens system. Both are well know for scanning an entire document dimension to obtain a digital image of it. However, the sensor 22A here is not being used here for digital imaging. Instead, it is being used in an entirely different application, namely, as a timing and/or positional sensor for registration marks.

As noted above, the particular application of FIGS. 1 and 2 here is merely one example. Only one, or more, such optical sensors may be provided, depending on the desired application and function. Various possible applications and functions of such sensed permanent positional marks on moving image bearing surfaces are described, for example, above and in various above-cited patents. If desired, these permanent registration markings may be located, as shown, adjacent respective image areas, but it is not essential that there be a mark for each image position, or that there even be plural marks or plural sensors.

With the disclosed embodiment, surface motion of the belt surface is sensed in both the process and lateral directions simultaneously using a single linear image sensor reading "Z" shaped motion sensing marks on the belt surface. This avoids previous systems needing two sensor systems to sense each direction separately, whereas this approach can measure both directions with a single sensor.

The system disclosed herein is not limited to photoreceptor belts, and can provide accurate process direction motion sensing that can be used for precise velocity regulation of a belt surface for applications such as various image receivers as well as accurate positioning of objects attached to a belt surface. For example, sheets of paper or other objects being carried on vacuum transports or electrostatic belt transports, in machines, or in manufacturing operations. At the same time, with the same sensor, the lateral direction position sensing provided here may be used to measure belt lateral tracking and provide tracking control such as by various well known active steering systems. With a "Z" mark track that is sufficiently straight with respect to centerline of belt, this could be used to eliminate the need for belt edge learning and feed-forward cancellation systems used in some such active steering systems. The lateral position sensing can also be used for position sensing of objects on or attached to the belt surface, such as electronic registration of tandem color images on belts, as in the example of FIGS. 1 and 2.

The linear array image sensor 22A can provide a video signal output which can be digitized into a gray level per pixel digital data. This image data may be signal processed into incremental position measurements with a simple digital signal processor circuit. Sub-pixel resolution of the mark crossing locations may be accomplished using a centroidal processing algorithm. With the horizontal top and bottom bars or lines of the "Z" marks oriented orthogonal to the process motion, they may be used to sense process direction motion. Those portions of the motion sensing marks may be used to form a ladder chart of marks, as previously explained in connection with the sheet transport belt or roller of an ink jet printer, as well as a photoreceptor. The linear array image sensor 22A is located with their line scan of sensors 50 parallel to the process motion, such that the "Z" marks are flowing across (along) the linear array of image pixels. The differential of the diagonal bar crossing location relative to the top and bottom bar of the "Z" may be used to measure lateral belt position. When the diagonal crossing on the image sensor array has equal spacing between both the top and bottom crossings, the belt is located at the lateral null position at the center of the +/−lateral position sensing range determined by the width of the "Z" shaped mark.

The linear array image sensor video signal is digitized and processed into measurements of position locations where the bars of the "Z" mark intersect the linear array of photosites.

To describe the sensing of the "Z" shaped positional mark 12A by the is sensor 22A in other words, the mark sensor (detector) 22A provides an output signals count from the detection (crossover) of the lead edge or leg of the "Z" pattern (the top or bottom line of the "Z") passing the first sensor 51 of the linear array of sensors 50 to the number of detectors triggered (or not triggered) between that point and the crossover of the intermediate diagonal line or leg of the "Z." It may also provide a sensors 50 count to the trail edge (bottom or top line) of the "Z." By comparing the sensors 50 count difference, which is directly proportional to the lateral position of the angled line of the "Z" mark to the sensor, one can accurately calculate the "Z" mark position relative to the centroid or center line in the process direction of the mark sensor. That is somewhat similar in result but different In operation and function from the two "timestamp" signal outputs of the bi-cell MOB detectors 20A or 20B of FIG. 2. However, bi-cell detectors are normally used for "chevron" shaped MOB's having the same line angles as the detection areas of the bi-cells. However, it will be appreciated that the sensor disclosed herein could be used in lieu of these bi-cell detectors for sensing toner or other temporary MOB registration marks in certain applications.

The "Z" mark (a.k.a. pattern, target, or cursor) size may be made sufficiently large enough to insure that it is within the sensing range of the sensor even for a maximum amount of anticipated gross initial lateral misregistration. The latter will of course vary with machine tolerances of the particular product.

As noted above, lateral registration of the moving surface with the "Z" mark can be maintained, for example, by adjusting the moving surface lateral position in response to the sensor output signals so that the sensor is detecting approximately the center of the "Z", using various known feedback or closed loop systems, such as those in above-cited patents. I.e., maintaining the moving surface position such that the "Z" mark is detected in a lateral position in which the middle of the angled line of the "Z" is triggering the midpoint of the array of detectors of the sensor, as shown in FIG. 3. Or, to express it yet another way, when the intermediate crossing time of the angled line in the "Z" pattern is substantially equidistant from the crossing times of the top and bottom lines of the "Z" pattern.

Although closely spaced multiple sensing marks in a linear track on the moving surface are shown, and are desirable for process direction motion sensing and control, it will be appreciated that in certain applications for measuring and control of just the lateral position of the moving surface one may only need one Z mark for as many points as one wants to measure around the belt for that purpose. In some systems that could be as few as one Z mark per belt or roller revolution. Thus, the Z marks need not always be closely spaced, but normally there will be a plurality of Z marks and they will be at least somewhat closely spaced.

As is well known in the art, most commercially available linear imaging bar linear image sensors have a single (or dual) output signal where the portion of that signal representing each pixel is clocked out as a serial data stream, or, in other words, as an analog shift register. However, It could also be a linear array of discrete optical sensors with discrete outputs, i.e., with each pixel having it's own output. That is, alternatively, a linear image sensor array that has direct individual outputs (digitized to gray level per pixel) which would feed into a parallel processing hardware that calculates the position of the marks relative to the image sensor array. That could overcome any problem with a real time lag delay from the exposure of the marks on the array for the clocking out of the analog signal and digitizing and signal processing it into a position movement signal. Thus, while the sensor could be the same as a commercially available linear imaging bar, it may be preferable to utilize a more customized linear image sensor module that is tailored more for this motion sensing application.

As noted, exemplary permanent "Z" marks on or in a selected area of the moving surface material may alternatively be painted or printed thereon with a light absorptive or light reflective paint or dye. Or, the "Z" marks may be made by apertures through the otherwise opaque material, providing for light transmission detectable through the apertures. For example, by making three linear laser cut or punched apertures or slots in the material, forming a "Z" aperture in combination, but slightly separated at their ends. The "Z" mark provides a sufficient optical contrast (reflective or transmissive) to be optically detected relative to the adjacent area of the material. However, apertures through many moving surfaces, in particular, photoreceptor belts, are less desirable. They can weaken or damage the belt or reduce its effective life. They can cause increased stress and wear, or even belt tearing, in the areas of the belt holes or slots. Especially since typical photoreceptor belts in xerographic copiers or printers must flex and partially rotate around relatively small diameter driving and supporting rollers for many tens of thousands of cycles of use as imaging substrates.

The system and method disclosed herein can optionally provide the registration functions of many present belt hole marks and belt hole sensors, belt edge sensors, belt seam detectors, or various other positional detection functions. For example, labeling, timing, and/or registering of images on photoreceptor belts, and/or belt seam skipping. However, as noted, the present system does not require belt holes or belt edge detectors.

As disclosed in the first paragraph cross-referenced application, these permanent "Z" photoreceptor markings may be alternatively provided by image-wise oxidation of the ground plane layer of a conventional multilayer organic web photoreceptor, by simultaneous application of illumination and sufficient electrical current to those desired areas. That is, using selective ground plane oxidation to create selected position markings which are transparent. Thus, providing the registration functions of belt holes without requiring belt holes. For example, labeling, timing, and/or other registering of images on photoreceptor belts, and/or belt seam skipping. This can be done before or after the coated photoreceptor material web is cut and seamed into a photoreceptor belt.

As noted, the present system may be combined, as shown, with other color registration systems producing temporary imaged and toner-developed registration marks on the photoreceptor relating to registering the position of images being generated thereon relative to one another and/or the photoreceptor surface, which toner marks may be detected by MOB sensors to provide positional information therefrom. This is particularly valuable for color images where critically accurate superposition of different colors is required. However, the disclosed apparatus and method is not limited to color printers.

As noted above, and taught in the cited references, permanent registration marks in the belt (such as printed or transparent areas), may be operationally combined for enhanced registration with ROS imaged and toner developed temporary marks on the belt (MOB) corresponding to image positions. For example, the "Z" marks 32 shown in FIG. 2 adjacent one image area 30, which temporary marks 32 on the belt surface are positionally read as they pass under the MOB sensors 20A and 20B with movement of the belt, then erased by the printer's cleaning system.

The imposed registration marks are, of course, desirably outside of the maximum image area. Where the printer is one with its images and paper path registered to one side, as is typical (rather than center registered) the registration marks may be towards and along the other or outside edge of the PR belt. However, even for such an edge-registered printer system, if skew detection of the moving surface is also desired, for maximum skew detection sensitivity and accuracy, the "Z" or other registration marks, and separate sensors for reading them, may be positioned spaced apart on opposite sides of the belt.

While the embodiment disclosed herein is preferred, it will be appreciated from this teaching that various alternatives, modifications, variations or improvements therein may be made by those skilled in the art, which are intended to be encompassed by the following claims.

What is claimed is:

1. A method of accurately sensing the position of a moving surface having a primary movement direction, wherein said moving surface is marked with a plurality of optically detectable sensing marks, said optically detectable sensing marks having transverse lines extending transversely of said primary movement direction and angled lines extending at an angle to said primary movement direction, and wherein said optically detectable sensing marks are detected by an optical sensing marks sensor, wherein;

said sensing marks sensor comprises a linear array of a multiplicity of individual optical sensors, said sensing marks sensor optically detects said optical sensing marks to provide positional signals from said moving surface in said primary movement direction from said transverse lines extending transversely of said primary movement direction being moved past said sensing marks sensor, and said sensing marks sensor optically detects said optical sensing marks to provide transverse positional signals from said moving surface orthogonal to said primary movement direction from said angled lines extending at an angle to said primary movement direction by signals from respective said individual optical sensors which are actuated by a movement of said moving surface being moved past said sensing marks sensor in said primary movement direction in between a said transverse line extending transversely of said primary movement direction and a said angled line extending at an angle to said primary movement direction.

2. The method of accurately sensing the position of a moving surface of claim 1, wherein said moving surface is an imageable photoreceptor belt having said optical sensing marks extending linearly along said photoreceptor belt.

3. The method of accurately sensing the position of a moving surface of claim 1, wherein said optical sensing marks are in the general shape of a "Z."

4. The method of accurately sensing the position of a moving surface of claim 1, wherein said optical sensing marks are in a linear track and relatively closely spaced apart, and wherein said sensing marks sensor linear array of a multiplicity of individual optical sensors extends in said primary movement direction by a greater distance than said spacing between said optical sensing marks, so that more than one at a time of said optical sensing marks is moving past said sensing marks sensor linear array of a multiplicity of individual optical sensors.

5. The method of accurately sensing the position of a moving surface of claim 1, wherein said optical sensing marks are Z marks with top and bottom said transverse lines and a central said angled line, and said signals from said sensing marks sensor linear array of a multiplicity of individual optical sensors for said central said angled line are compared to said signals from said sensing marks sensor linear array of a multiplicity of individual optical sensors for both said top and bottom said transverse lines.

6. The method of accurately sensing the position of a moving surface of claim 1, wherein said optical sensing marks are Z marks, and wherein said Z marks are smaller in said primary movement direction than the length of said sensing marks sensor linear array of a multiplicity of individual optical sensors.

7. The method of accurately sensing the position of a moving surface of claim 6, wherein said Z marks comprise a top and bottom bar and an intermediate diagonal bar, and said sensing marks sensor linear array detects an intersection location relative thereto, and wherein the differential of the diagonal bar detected intersection location relative to the top and bottom bar detected intersection location of a Z mark is used to measure lateral movement of said moving surface.

8. The method of accurately sensing the position of a moving surface of claim 7, wherein when said intersection location of said intermediate diagonal bar on said registration marks sensor linear array is equidistant between said top and bottom bar intersection locations, it is assumed that said moving surface is being maintained with a desired lateral registration.

9. The method of accurately sensing the position of a moving surface of claim 7, wherein the lateral width of said Z marks is selected to correspond to the desired maximum lateral position sensing range for said moving surface.

10. In a xerographic printing apparatus having a photoreceptor belt for developing images thereon, said photoreceptor belt having optical sensing marks, and said photoreceptor belt having a primary movement direction, said xerographic printing apparatus also having a photoreceptor registration system for the registration of said photoreceptor belt relative to said images on said photoreceptor belt, said photoreceptor registration system including at least one sensing marks sensor for optically detecting the movement of said optical sensing marks of said photoreceptor belt, the improvement wherein;

said optical sensing marks of said photoreceptor belt have at least one edge extending transversely of said primary movement direction and at least one other edge extending at an angle to said primary movement direction, and said sensing marks sensor comprises a linear array of a multiplicity of individual optical sensors which optically detect said optical sensing marks to provide positional signals in said primary movement direction from said at least one edge extending transversely of said primary movement direction and also provide positional signals orthogonal to said primary movement direction from said at least one other one edge extending at an angle to said primary movement direction by respective said individual optical sensors actuated by the movement of said surface in said primary movement direction in between said at least one edge extending transversely of said primary movement direction and said at least one other one edge extending at an angle to said primary movement direction.

11. The xerographic printing apparatus of claim 10, wherein said optical sensing marks have a "Z" configuration.

* * * * *